(12) United States Patent
Huang et al.

(10) Patent No.: US 8,987,407 B2
(45) Date of Patent: Mar. 24, 2015

(54) FUEL CELL CATALYST LAYER HAVING SULFONATED POLY(ARYLENE ETHER)S AND MANUFACTURING METHOD THEREOF

(71) Applicant: National Sun Yat-sen University, Kaohsiung (TW)

(72) Inventors: Wen-yao Huang, Kaohsiung (TW); Chun-Che Lee, Kaohsiung (TW); Hsu-feng Lee, Kaohsiung (TW); Steven Holdcroft, Burnaby (CA)

(73) Assignee: National Sun Yat-sen University, Kaohsiung (TW)

( * ) Notice: Subject to any disclaimer, the term of this patent is extended or adjusted under 35 U.S.C. 154(b) by 0 days.

(21) Appl. No.: 14/161,766

(22) Filed: Jan. 23, 2014

(65) Prior Publication Data
US 2015/0030965 A1    Jan. 29, 2015

(30) Foreign Application Priority Data
Jul. 25, 2013    (TW) .............................. 102126748 A (51) Int. Cl.
*H01M 4/90*    (2006.01)
*H01M 4/88*    (2006.01)

(52) U.S. Cl.
CPC .......... *H01M 4/9008* (2013.01); *H01M 4/8828* (2013.01)

USPC .......... 528/125; 528/373; 528/370; 528/171; 528/295; 528/220; 528/27

(58) Field of Classification Search
USPC ............ 528/125, 171, 295, 220, 27, 373, 370
See application file for complete search history.

(56) References Cited

PUBLICATIONS

Study of sulfonatecl poly(arylene ether)s for catalyst layer of fuel cell Jan. 25, 2013 Liu et al. (2013 ROC annual meeting for polymer society).

*Primary Examiner* — Shane Fang
(74) *Attorney, Agent, or Firm* — Mark M. Friedman (57) ABSTRACT

A fuel cell catalyst layer having sulfonated poly(arylene ether)s and a manufacturing method therefor are provided. The manufacturing method includes steps of: providing at least one type of sulfonated poly(arylene ether)s; mixing the sulfonated poly(arylene ether)s with a catalyst composition to prepare a catalyst slurry; and coating the catalyst slurry to form a film which is dried to be an electrode catalyst layer, in which the weight ratio of the sulfonated poly(arylene ether)s is 5-50 wt %. The sulfonated poly(arylene ether)s in the electrode catalyst layer can provide good thermal stability, glass transition temperature, chemical resistance, mechanical properties, water impermeability, low proton transmission loss, and a relatively simple process to shorten the manufacturing time and lower the cost thereof.

11 Claims, 5 Drawing Sheets

FUEL CELL CATALYST LAYER HAVING SULFONATED POLY(ARYLENE ETHER)S AND MANUFACTURING METHOD THEREOF

CROSS REFERENCE TO RELATED APPLICATIONS

This application claims the priority of Taiwan Patent Application No. 102126748, filed on Jul. 25, 2013. This invention is partly disclosed in a thesis entitled "Research of sulfonated poly(acrylene ether)s applied to fuel cell catalyst layer" on Jan. 25, 2013 completed by Hsu-Feng Lee, Yi-Chiang Huang, Wei-Ting Liu, Po-Hsun Wang, Chun-Che Lee and Wen-Yao Huang.

FIELD OF THE INVENTION

The present invention relates to a fuel cell catalyst layer and a manufacturing method thereof, and in particular relates to a fuel cell catalyst layer having sulfonated poly(acrylene ether)s and a manufacturing method thereof.

BACKGROUND OF THE INVENTION

In a variety of fuel cells, a proton exchange membrane (PEM) is utilized most commonly. Hydrogen and oxygen are typically used in PEM fuel cells by chemical reaction between the catalyst layers to generate electricity and water without carbon dioxide during the reaction.

The key components in PEM fuel cells comprises the proton exchange membrane (PEM), bipolar plates, electrodes and hydrogen storage materials (fuel storage), etc., and the combinations thereof are referred to as a membrane electrode assembly (MEA), wherein the electrodes are made of two sheets of thin porous electrodes to be an anode and a cathode, and separated by a solid state polymer of the proton exchange membrane. One side of each sheet is coated with a catalyst, when hydrogen is introduced into the cell, the hydrogen is decomposed into electrons (E−) and protons (H+) by the anode catalyst. The electrons flow along the external circuit to supply power to a load (such as a motor or lamp), with the protons arriving the cathode through the proton exchange membrane. Then, the catalyst from the cathode side actuates the protons and the electrons reflowed from the load to combine with the oxygen in the air, so as to generate water and heat.

The main composition of the electrode catalyst layer is a composite layer formed of platinum and polymer electrolyte gel in micro phase separation, wherein the phases are staggered and permeate each other thereby transmit electrons, protons, and gases. The polymer electrolyte of the electrode catalyst layer must allow the protons and the reactive gases to enter into the reaction sites, and it also has the function of passing water. It is worth emphasizing that the polymer electrolyte in the electrode catalyst layer must have high conductivity for protons, unlike the polymer electrolyte in the proton exchange membrane which must have high permeability for reactive gases, the polymer electrolyte under a high acid and high temperature environment must have stable redox properties. Further, the polymer electrolyte of the catalyst layer and the proton exchange membrane must have compatibility and therefore be able to avoid delamination during long term operation or the production process of the components. That is to say, the polymer electrolyte of the catalyst layer and the proton exchange membrane preferably have a similar molecular structure.

Therefore, it is necessary to provide a fuel cell catalyst layer having sulfonated poly(acrylene ether)s and a manufacturing method thereof to solve the problems existing in conventional technologies, as described above.

SUMMARY OF THE INVENTION

A primary object of the present invention is to provide a fuel cell catalyst layer having sulfonated poly(arylene ether)s and manufacturing method thereof by mixing a specific ratio of the sulfonated poly(arylene ether)s which have more substituent groups and more sulfonate groups with a platinum catalyst (Pt/C) to obtain an electrode catalyst layer suitable for a fuel cell, the sulfonated poly(arylene ether)s therein can provide good thermal stability, glass transition temperature, chemical resistance, mechanical properties, process stability, and low-cost production, and can effectively prevent water penetration and reduce the loss of proton transmission. Moreover, the manufacturing method (such as spray coating, spin coating, etc.) has the benefit of shortening the manufacturing process and reducing manufacturing costs. It is certainly profitable to apply sulfonated poly(arylene ether)s as the material for the electrode catalyst layer of the fuel cell.

To achieve the above object, the present invention provides a fuel cell catalyst layer having sulfonated poly(arylene ether)s used for an electrode catalyst layer of a fuel cell, comprising: at least one type of sulfonated poly(arylene ether)s and at least one type of catalyst, wherein the sulfonated poly(arylene ether)s has the structure as the following formula (I):

formula (I)

wherein X is

, or

Y is selected from n is an integer equal to or greater than 2; i is an integer between 1-10; j is an integer between 0-2; and the sulfonated poly(arylene ether)s is 5% to 50% by weight of the electrode catalyst layer.

In one embodiment of the present invention, the sulfonated poly(arylene ether)s is 20% to 40% by weight of the electrode catalyst layer.

In one embodiment of the present invention, the catalyst comprises the particles of platinum and carbon black, wherein the platinum is coated on the carbon black having a particle diameter of 2 to 20 nm.

In one embodiment of the present invention, the platinum is 5% to 50% by weight of the catalyst.

In one embodiment of the present invention, the thickness of the electrode catalyst layer is between 2 and 25 micrometer ($\mu$m).

In one embodiment of the present invention, the electrode catalyst layer is a cathode, an anode, or both of the fuel cell.

In one embodiment of the present invention, the sulfonated poly(arylene ether)s and the catalyst form the aggregation particles, and the average particle diameter of the aggregation particles is between 300 and 600 nm.

Furthermore, the present invention provides a manufacturing method for a fuel cell catalyst layer having sulfonated poly(arylene ether)s, comprising steps of:

providing at least one type of sulfonated poly(arylene ether)s, which has the structure as the following formula (I):

wherein X is

Y is selected from

-continued or n is an integer equal to or greater than 2; i is an integer between 1-10; j is an integer between 0-2;

mixing the sulfonated poly(arylene ether)s and a catalyst to prepare a catalyst slurry; and coating the catalyst slurry to form a film, then drying the film to form an electrode catalyst layer, wherein the sulfonated poly(arylene ether)s is 5% to 50% by weight of the electrode catalyst layer.

In one embodiment of the present inventions, the coating is spray coating or spin coating.

In one embodiment of the present inventions, the catalyst and the sulfonated poly(arylene ether)s are totally 0.5% to 20.0% by weight of the catalyst slurry.

In one embodiment of the present inventions, the solvent of the catalyst slurry is selected from dimethyl sulfoxide, dimethyl acetamide, methanol, ethanol, or an aqueous solution thereof.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 1:
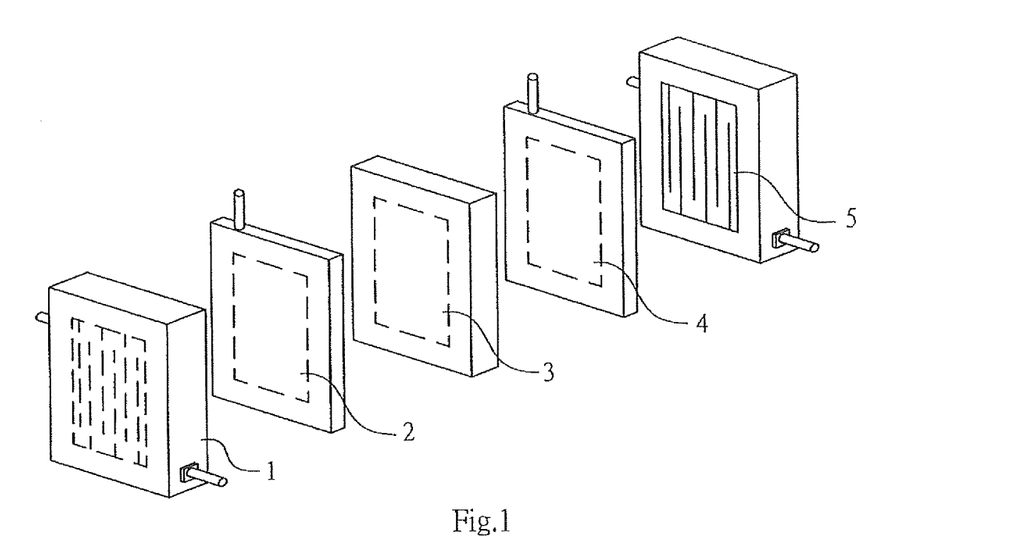
FIG. 1 is an exploded perspective view of a fuel cell according to the preferred embodiment of the present invention.
Figure 2:
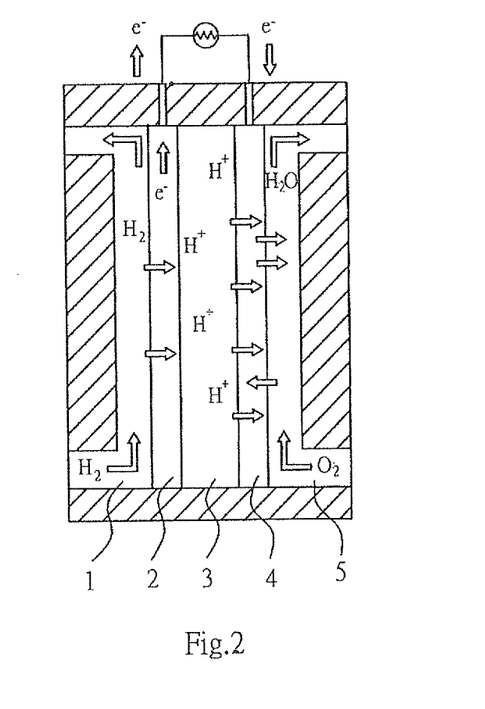
FIG. 2 is a cross-sectional view of a fuel cell according to the preferred embodiment of the present invention.

Please refer to FIGS. 1 and 2 which show a fuel cell according to a preferred embodiment of the present invention, comprising in turn a first gaseous flow field plate 1, an anode layer 2, a proton exchange membrane (PEM) 3, a cathode layer 4, and a second gaseous flow field plate 5, wherein the anode layer 2, the proton exchange membrane 3, and the cathode layer 4 constitute a membrane electrode assembly (MEA). The first gaseous flow field plate 1 has a first gas inlet, a first gaseous flow field and a residual gas outlet, wherein the first gas is, for example, hydrogen ($H_2$); the sulfonated poly(arylene ether)s mixed with the platinum catalyst (Pt/C) provided in the present invention are adopted for the cathode layer 2 and the anode layer 4, which is an electrode catalyst layer; the proton exchange membrane 3 is made of a polymer film having a simple sulfonated poly(arylene ether)s; the second gaseous flow field plate 5 has a second gas inlet, a second gaseous flow field, and a water vapor outlet, wherein the second gas is, for example, oxygen ($O_2$) or air. The detailed structure of the above-mentioned anode layer 2, the proton exchange membrane 3, the cathode layer 4, and the manufacturing method thereof in a preferred embodiment will be described in detail hereinafter using the drawings.

In a preferred embodiment, the present invention uses the sulfonated poly(arylene ether)s as the material for the polymer film substrate having the solid state electrolyte. The sulfonated poly(arylene ether)s, after a sulfonated reaction with a different ratio (5 wt %-50 wt %), and the platinum catalyst (Pt/C) are mixed and dissolved in a solvent such as dimethyl sulfoxide (DMSO), dimethyl acetamide (DMAc), methanol (MeOH) and/or ethanol (EtOH), etc., then the electrode catalyst layer in the form of a film is effectively formed in a simple manner, for example, by spraying coating or spin coating, etc., and is used as the anode layer 2 and the cathode layer 4 of a fuel cell. In this embodiment, the present invention provides a manufacturing method for a fuel cell catalyst layer having sulfonated poly(arylene ether)s as follows:

First, the manufacturing method for the fuel cell catalyst layer having sulfonated poly(arylene ether)s according to the preferred embodiment of the present invention is to provide a sulfonated poly(arylene ether)s having the structure as following formula (I):

wherein X is

-continued or

Y is selected from

-continued n is an integer equal to or greater than 2.

For the above-mentioned poly(arylene ether)s, please refer to the method and steps of the Taiwan patent application No. 101111194 "POLYMER OF STERICALLY ENCUMBERED SULFONATED POLY(ARYLENE ETHER)S AND MANUFACTURING METHOD THEREFOR" in 24 March, 2012. Briefly, first the dibromo compound with multi-benzene rings (e.g., and 4-fluoro-3-trifluoromethyl phenyl boronic acid react to form a fluoride monomer (e.g.  )

via Suzuki reaction in this step, then the fluoride monomer reacts with a biphenol or a polyphenol monomer (e.g.  )

via the nucleophilic displacement reaction to form the poly(arylene ether)s (PAEs, for example

).

Alternatively, when Y is selected from three different groups with multi-benzene rings, the poly(arylene ether)s of formula (I) are represented by P4a, P4b and P4c in following Table I, respectively.

TABLE 1

| X\Y | | | |
|---|---|---|---|
| | P4a | P4b | P4c |

Next, the above-mentioned poly(arylene ether)s P4a, P4b, P4c are sulfonated. The final product is the sulfonated poly (arylene ether)s having a highly steric structure and several sulfonic acid groups bonded to the core of multi-benzene rings. For example, 0.4 g of the poly(arylene ether)s (P4a, P4b, P4c) is dissolved in 30 mL of anhydrous dichloromethane, and 10 mL of the sulfonating agent, such as trimethylsilyl chlorosulfonate (8 eq) is dissolved in 10 mL of dichloromethane, then the poly(arylene ether)s in the solution of dichloromethane is added in dropwise under a nitrogen atmosphere to perform sulfonation. After reacting for 24 hrs, 20 mL of ethanol is added to terminate the reaction, and the reactant solution is poured into hexane/ethanol solution (300 mL, 1:1 v/v) and finally washed by pure water then filtered. The sulfonated poly(arylene ether)s are obtained after drying at 80° C. for 24 hours, which has the following formula (II):

formula (II)

Wherein i is an integer of between 1 and 10; j is an integer in the range of 0 to 2; n is an integer equal to or greater than 2. The poly(arylene ether)s after the sulfonation are called SP4a, SP4b, and SP4c respectively, wherein the sulfonated poly(arylene ether)s SP4a is, for example as the following molecular formula, but the number and locations of sulfonic acid groups are not limited thereto.

Now, the phase inversion method can be used to dissolve a solute in a solvent in the present invention, and the liquid state of the solution will turn form the gel state into a dry film to be a proton exchange membrane. For example, 2.0 g of the sulfonated poly(arylene ether)s SP4a, SP4b, or SP4c is dissolved in 20 mL of N,N-dimethyl acetamide (DMAc) as a solvent, then the solution is stirred until the next day until forming a homogeneous solution. Next, the homogeneous solution is centrifuged at 5000 rpm in the centrifuge for 20 minutes, and the upper layer of the solution is extracted and dropped into a round-bottom culture dish to be spread as a film with a diameter of 10 cm and a thickness between 1 μm and 250 μm in a liquid state, then the film is baked in a vacuum oven at 80° C. until the next day while the solvent is volatilized to form a gel-state film. The remaining solvent can be completely removed in vacuum to obtain a dried film. The film contains only the sulfonated poly(arylene ether)s SP4a, SP4b, or SP4c and can be used as the proton exchange membrane 3 in FIGS. 1 and 2.

After providing the steps for sulfonating the poly(arylene ether)s detailed above, the manufacturing method for the fuel cell catalyst layer having sulfonated poly(arylene ether)s according to the preferred embodiment of the present invention is then: mixing the sulfonated poly(arylene ether)s and a catalyst to form a catalyst slurry. For example, providing a powder of platinum/carbon (Pt/C) catalyst (TEC10E50E, TKK system, in which Pt is 45~50 wt % of the total weight of the platinum/carbon catalyst component, such as 46.4 wt %, and Pt is coated on the surface of the carbon black having the particle diameter of 2~4 nm), then the Pt/C catalyst is mixed with a powder of sulfonated poly(arylene ether)s SP4a, SP4b, or SP4c, the mixed powder then being stirred to dissolve in a little water and methanol (water:methanol=1:1 by volume) for 15 minutes, subject to ultrasonic vibration for 30 minutes to ensure that the Pt/C catalyst and the sulfonated poly aromatic ether polymer are uniformly mixed, thus the catalyst slurry is prepared, wherein the Pt/C catalyst and the sulfonated poly(arylene ether)s are totally 0.5% to 3.0% by weight of the catalyst slurry, such as about 1.0 wt % (i.e. the solid weight). The solvent of water and methanol can be replaced with dimethyl sulfoxide (DMSO), dimethyl acetamide (DMAc), methanol (MeOH), ethanol (EtOH), or an aqueous solution thereof.

After the step of preparing the catalyst slurry, the manufacturing method for the fuel cell catalyst layer having sulfonated poly(arylene ether)s according to the preferred embodiment of the present invention is then: coating the catalyst slurry to form a film and drying to be the electrode catalyst layer, for example by spray coating or spin coating at room temperature (or 25~100° C.), thereby the catalyst slurry is coated to form the electrode catalyst layer having an area of 5×5 cm2 and a thickness between 7 μm and 12 μm, such as the anode layer 2 and the cathode layer 4 in FIGS. 1 and 2, wherein the anode layer 2 and the cathode layer 4 may use the catalyst slurry prepared by the same or different sulfonated poly(arylene ether)s SP4a, SP4b, or SP4c. After the solvent (water and methanol) are dried by heating or air-drying, in the electrode catalyst layer, the Pt/C catalyst is approximately 95 wt % 50 wt %, for example 80 wt %, 70 wt % or 60 wt %; while the sulfonated poly(arylene ether)s is approximately 5 wt % to 50 wt %, for example 20 wt %, 30 wt % or 40 wt %. Furthermore, the other polymer in a commercially available Nafion® D520, as in the control group, is mixed with the Pt/C catalyst as a catalyst slurry, then coated and dried to prepare a control group of the electrode catalyst layer.

As three different types of the poly(arylene ether)s are synthetized according to the present invention, their ion exchange capacity (IEC) and appropriate value of the water uptake and hydration would immediately be selected. The results represented in the following table 2 show that when the film made of sulfonated poly(arylene ether)s SP4a, SP4b, or SP4c as a simple thin-film state (the proton exchange membrane 1 and 3 shown in FIG. 2) has IEC larger than 2 meq/g, the proton conductivity thereof can be compared with that of the proton exchange membrane of the control group (Nafion 211), so that they have the potential of being the solid-state electrolyte polymer. The feature of the polymer SP4c is similar to that of Nafion 211, having low acidity, therefore the following is represented using SP4c as the fuel cell catalyst layer (i.e., the anode layer 2 and the cathode layer 4) and analyzed.

TABLE 2

| Film | IEC (meq/g) | Proton conductivity (mS/cm) | Water uptake (%) | Hydration value (λ) |
| --- | --- | --- | --- | --- |
| SP4a | 2.44 | 103 | 370 | 87 |
| SP4b | 2.82 | 120 | 109 | 22 |
| SP4c | 2.21 | 72 | 61 | 15 |
| Nafion 211 | 1.01 | 150 | 23 | 11 |

Figure 3:
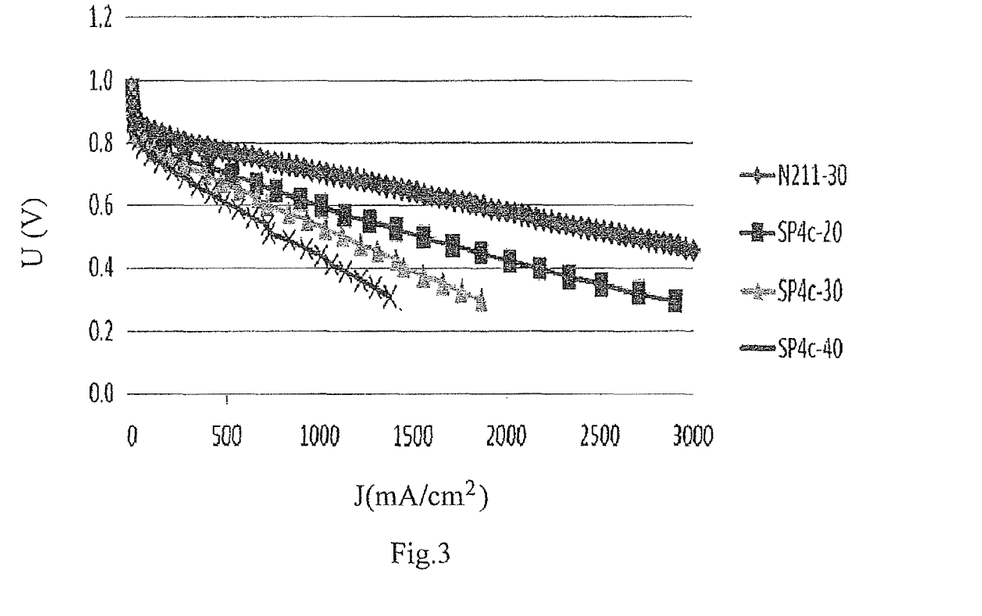
FIG. 3 is a polarization curve of the OCV measured from the fuel cell catalyst layer as a cathode layer in the control group (Nafion D520—30 wt %) and in the present invention (SP4c—20 wt %, 30 wt %, 40 wt %)
Figure 4A:
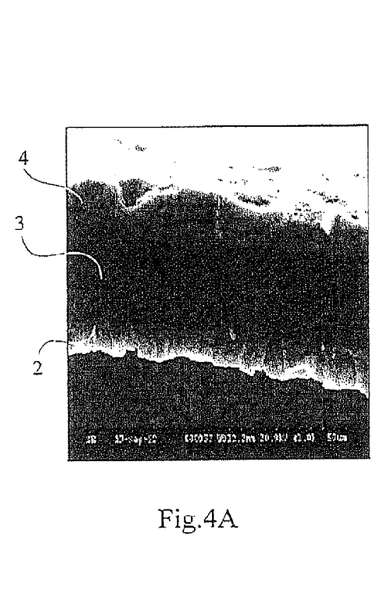
FIGS. 4A-4D are SEM diagrams (1,000-1,500×) for showing the electrode catalyst layer as a cathode layer or an anode layer of the fuel cell in the control group (Nafion D520—30 wt %) and in the present invention (SP4c—20 wt %, 30 wt %, 40 wt %)
Figure 4B:
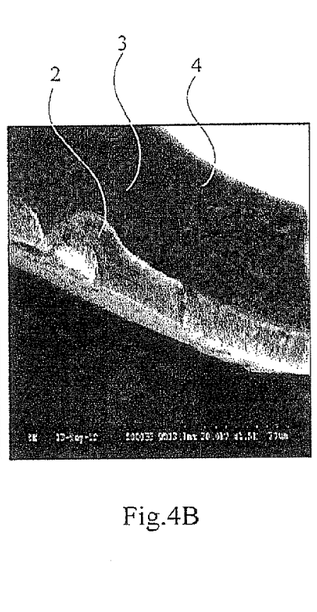
Figure 4C:
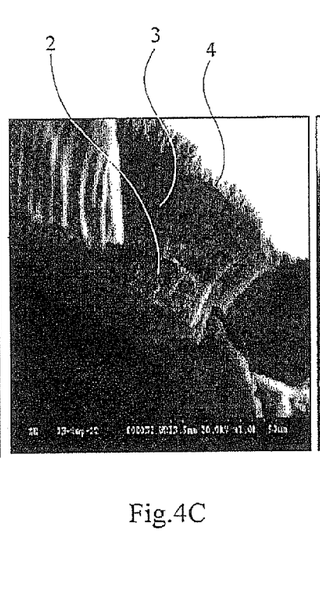
Figure 4D:
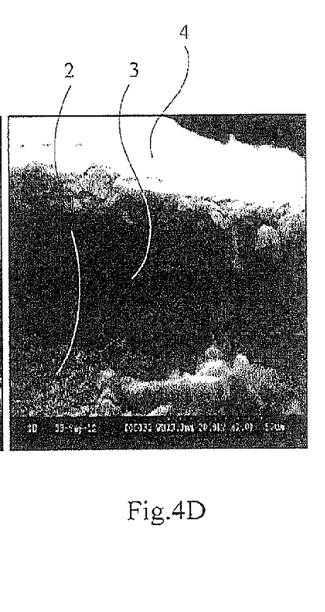

After the formation of the above-mentioned electrode catalyst layer, the electrode catalyst layer can be used to construct the membrane electrode assembly (MEA) of the fuel cell in FIGS. 1 and 2, wherein the test conditions of the fuel cell are 80° C. in the relative humidity of 100% and the commercial Nafion 211 is used as a proton exchange membrane, the film containing 30 wt % of the commercial Nafion D520 and 70 wt % of Pt/C is used as an anode layer so as to compare the cathode layer of the control group (30 wt % Nafion D520 and 70 wt % of the Pt/C) with the three types of cathode layers (20 wt %, 30 wt % or 40 wt % of SP4c and 80 wt %~60 wt % of Pt/C) in the present invention, and the $H_2$ and $O_2$ gas flow rates are respectively regulated to be 0.5 slpm and 1.0 slpm (liters/min) in the anode layer 2 and the cathode layer 4. The control group uses Nafion D520 mixed with the Pt/C catalyst as a solid polymer electrolyte (ionomer) of the electrode catalyst layer, and it is necessary to balance them for about 24 hours; while the present invention uses SP4c mixed with Pt/C catalyst as the cathode catalyst layer, which requires about 36 hours in order to achieve balance. Before measuring, the membrane electrode assembly was maintained at a constant potential of 0.5V, then the value of open circuit voltage (OCV) is equilibrated. When measuring the polarization curve of OCV, setting 0.3V (over 200 mA) to be the terminating potential of the measurement and taking 1 data every 5 minutes, the results are as shown in FIG. 3.

It is known form FIG. 3 that comparing the cathode layer of the control group (30 wt % Nafion D520 and 70 wt % of the Pt/C), with the cathode layer of the present invention in three (20, 30, 40 wt % of SP4c and 80-60 wt % of the Pt/C), when the Pt/C catalyst keeps 0.4 mg/cm², the weight ratio of SP4c changes to observe the changes of the polarization curves of OCV in the fuel cell, the basic parameters are as shown below in Table 3. It is known form FIG. 3 that at 80° C. in relative humidity of 100%, the efficiency of the present invention is largest, nearly obtaining 3000 mA/cm², when SP4c is about 20 wt %. In this case, the same efficiency can be obtained with 30 wt % of Nafion D520, as in the cathode layer of the control group.

TABLE 3

| Cathode layer | Proton exchange membrane | Solid-state electrolyte of the cathode layer | Weight of the solid-state electrolyte (wt. %) | IEC of the cathode layer (meq/g) | Conductivity of cathode layer (mS/cm) |
| --- | --- | --- | --- | --- | --- |
| Nafion-30 | N211 | Nafion D520 | 30 | 1.06 | — |
| SP4c-20 | N211 | SP4c | 20 | 2.21 | 72 |
| SP4c-30 | N211 | SP4c | 30 | 2.21 | 72 |
| SP4c-40 | N211 | SP4c | 40 | 2.21 | 72 |

Furthermore, FIGS. 4A, 4B, 4C, and 4D show the SEM photos (cross-section 1000~1500×) of the anode layer and the cathode layer of the fuel cell in the control group (Nafion D520—30 wt %) and the present invention (SP4c—20 wt %, 30 wt %, 40 wt %). The upper, middle, and lower layer of every cross-section are respectively the cathode layer, the proton exchange membrane, and the anode layer, wherein the proton exchange membrane adopts the Nafion 211 film with the same thickness (25 μm). It can be seen from the above cross-sectional view that, when being used as the cathode layer, the thickness of the control group (Nafion D520—30 wt %) and the present invention (SP4c—20 wt %, 30 wt %, 40 wt %) are respectively 9.89, 7.56, 11.69, and 8.08 μm; when being used as the anode layer, the thickness thereof is respectively 10.39, 7.54, 9.70, and 9.20 μm. Therefore, none of the anode layers or the cathode layers have significant differences in thickness, i.e. the thickness of the electrode catalyst layer of the present invention is between 7 μm and 12 μm, the thickness of the electrode catalyst layer does not change significantly from the different content of the solid-state polymer electrolyte SP4c.

Figure 5A:
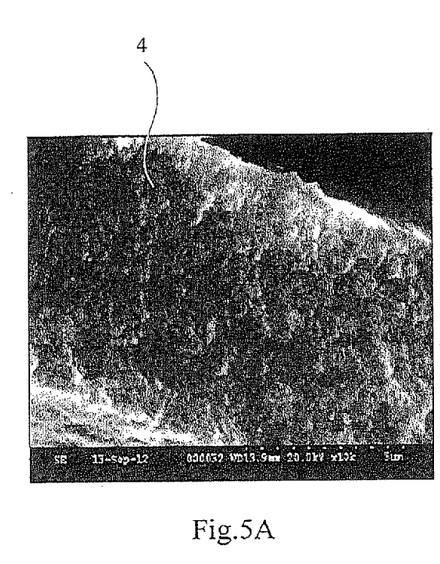
FIGS. 5A-5C are SEM diagrams (10,000×) for showing the electrode catalyst layer as an anode layer of the fuel cell in the present invention (SP4c—20 wt %, 30 wt %, 40 wt %)
Figure 5B:
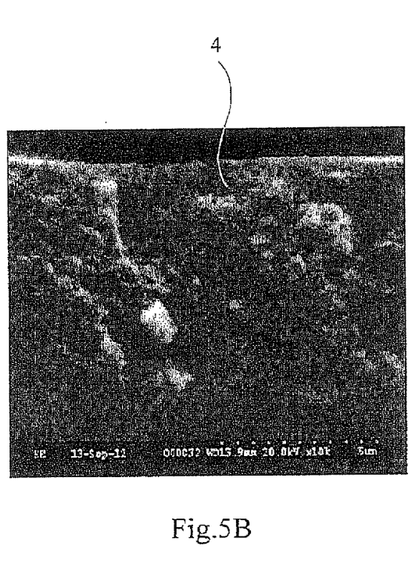
Figure 5C:
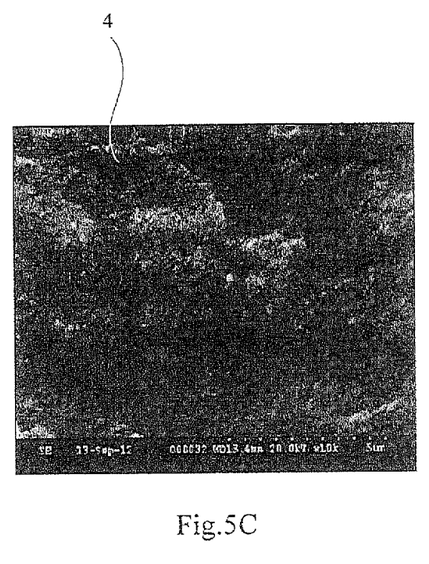

However, as shown in FIGS. 5A, 5B, and 5C, when the electrode catalyst of the present invention (SP4c—20 wt %, 30 wt %, 40 wt %) is the cathode layer of the fuel cell, it can be seen form the SEM photos that different content of the solid-state polymer electrolyte would produce a slight aggregation of particles, thereby making the surface pattern of the film slightly different.

Figure 6:
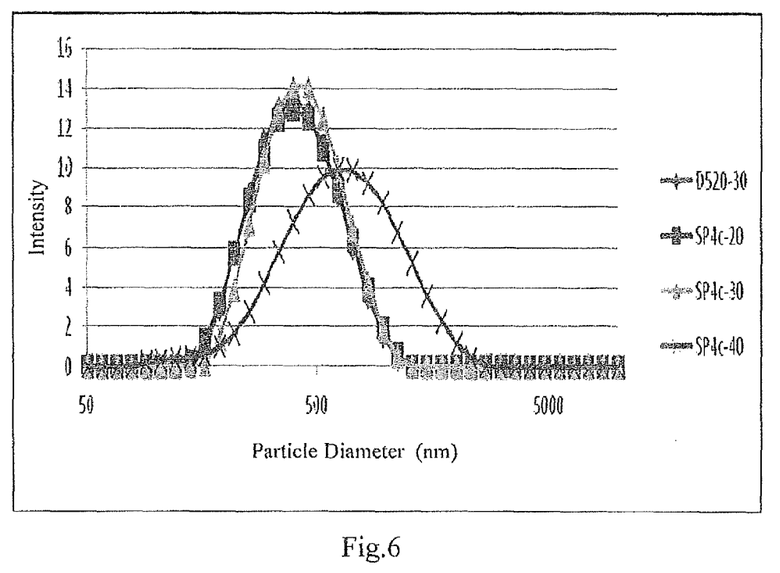
FIG. 6 is a distribution curve showing the particle diameter of the aggregation particles in the anode catalyst slurry measured by a dynamic light scattering spectrophotomer (DLS).

In addition, as shown in FIG. 6 and Table 4, the present invention further use a dynamic light scattering spectrophotomer (Malvern Instruments ZEN3600 Zetasizer) to observe the aggregation particle size of the cathode catalyst slurry made of D520—30 wt %, SP4c—20 wt %, SP4c—30 wt %, SP4c—40 wt %. The average particle diameter of the aggregation particles of the Pt/C catalyst and the sulfonated poly (arylene ether)s SP4c is between 300 nm and 600 nm, such as 364 nm, 413 nm, or 543 nm; the control group D520—30 wt % has an average particle diameter of approximately 385 nm in the aggregation particles of the cathode catalyst slurry. Thus, the cathode catalyst layer using different content than that of the solid-state polymer electrolyte SP4c makes the OCV polarization curves (FIG. 3) have significant differences, which depends on the change of the surface area (i.e. particle size) of the Pt/C catalyst, while the particle diameter of SP4c—20 wt % in the cathode catalyst layer is approximate to that of the control group Nafion D520—30 wt %, and therefore they have similar working efficiency. Furthermore, the use of different content of SP4c in the cathode catalyst layer will have different proton transmission capacity, the proton conductivity is improved in correspondence with the increasing content of the solid-state polymeric electrolyte. The particle size and the proton conductivity of the catalyst layer are as shown in Table 4.

TABLE 4

| Electrode catalyst layer | The weight ratio (wt %) of the electrode catalyst layer | Proton conductivity (mS/cm) | The average particle diameter (nm) of the aggregation particles |
| --- | --- | --- | --- |
| Nafion D520 | 30 | 12.62 | 385 |
| SP4c | 20 | 6.980 | 364 |
| SP4c | 30 | 4.706 | 413 |
| SP4c | 40 | 4.557 | 543 |

In the above-mentioned evaluation, the sulfonated poly (arylene ether)s SP4c of the present invention is a solid polymer electrolyte (catalyst ionomer) of the cathode catalyst layer has good performance of the material characteristics. When the content of SP4c is 20 wt % of the cathode catalyst layer, the efficiency of the fuel cell is good and similar to that of the commercial material Nafion D520 when it is the solid-state polymer electrolyte of the cathode catalyst layer. This is mainly due to the fact that the particle size of SP4c and D520 is similar, so that SP4c, SP4a, and SP4b are expected to be applied as a solid-state polymer electrolyte in the fuel cell catalyst layers. Meanwhile, regarding the quality transfer losses in the fuel cell, the solid-state polymer electrolytes sold in the market have a downward trend, but the solid-state polymer electrolyte SP4a, SP4b, and SP4c of the electrode catalyst layer prepared according to the present invention can effectively prevent water penetration and reduce quality transfer losses. Furthermore, the above-mentioned method also helps shorten the manufacturing process and reduce manufacturing costs, which facilitates its use as a fuel cell catalyst layer.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A fuel cell catalyst layer having sulfonated poly(arylene ether)s, used for an electrode catalyst layer of a fuel cell, comprising:
at least one type of sulfonated poly(arylene ether)s and at least one type of catalyst, wherein the sulfonated poly (arylene ether)s has the structure as the following formula (I):

formula (I)

wherein X is

Y is selected from

-continued n is an integer equal to or greater than 2; i is an integer between 1-10; j is an integer between 0-2; and the sulfonated poly(arylene ether)s is 5% to 50% by weight of the electrode catalyst layer.

2. The fuel cell catalyst layer according to claim 1, wherein the sulfonated poly(arylene ether)s is 20% to 40% by weight of the electrode catalyst layer.

3. The fuel cell catalyst layer according to claim 1, wherein the catalyst comprises the particles of platinum and carbon black, wherein the platinum is coated on the carbon black having a particle diameter of 2 to 20 nm.

4. The fuel cell catalyst layer according to claim 3, wherein the platinum is 5% to 50% by weight of the catalyst.

5. The fuel cell catalyst layer according to claim 1, wherein the thickness of the electrode catalyst layer is between 2 and 25 μm.

6. The fuel cell catalyst layer according to claim 1, wherein the electrode catalyst layer is a cathode, an anode, or both of the fuel cell.

7. The fuel cell catalyst layer according to claim 1, wherein the sulfonated poly(arylene ether)s and the catalyst form the aggregation particles, and the average particle diameter of the aggregation particles is between 300 and 600 nm.

8. A manufacturing method of a fuel cell catalyst layer having sulfonated poly(arylene ether)s, comprising steps of:

providing at least one type of sulfonated poly(arylene ether)s, which has the structure as following formula (I):

formula (I)

wherein X is

Y is selected from

-continued n is an integer equal to or greater than 2; i is an integer between 1-10; j is an integer between 0-2;

mixing the sulfonated poly(arylene ether)s and a catalyst to prepare a catalyst slurry; and coating the catalyst slurry to form a film, and then drying the film to form an electrode catalyst layer, wherein the sulfonated poly(arylene ether)s is 5% to 50% by weight of the electrode catalyst layer.

9. The manufacturing method according to claim 8, wherein the coating is spray coating or spin coating.

10. The manufacturing method according to claim 8, wherein the catalyst and the sulfonated poly(arylene ether)s are totally 0.5% to 20.0% by weight of the catalyst slurry.

11. The manufacturing method according to claim 10, wherein the solvent of the catalyst slurry is selected from dimethyl sulfoxide, dimethyl acetamide, methanol, ethanol, or an aqueous solution thereof.

* * * * *

UNITED STATES PATENT AND TRADEMARK OFFICE
CERTIFICATE OF CORRECTION

PATENT NO. : 8,987,407 B2
APPLICATION NO. : 14/161766
DATED : March 24, 2015
INVENTOR(S) : Huang et al.

It is certified that error appears in the above-identified patent and that said Letters Patent is hereby corrected as shown below:

Title Page, Item (72) Inventor is corrected to read:
-- Wen-yao Huang, Kaohsiung (TW);
Benjamin Britton, Burnaby (CA);
Chun-Che Lee, Kaohsiung (TW);
Hsu-feng Lee, Kaohsiung (TW);
Steven Holdcroft, Burnaby (CA) --.

Signed and Sealed this
Nineteenth Day of July, 2016

Michelle K. Lee
*Director of the United States Patent and Trademark Office*